April 2, 1968     S. P. ROSE     3,376,000
DIRECTIONALLY STABLE PARACHUTE
Filed July 6, 1967

INVENTOR.
Sigmund P. Rose

United States Patent Office 3,376,000
Patented Apr. 2, 1968

---

3,376,000
DIRECTIONALLY STABLE PARACHUTE
Sigmund P. Rose, 25—03 Steinway St.,
Astoria, N.Y. 11102
Filed July 6, 1967, Ser. No. 651,602
6 Claims. (Cl. 244—152)

ABSTRACT OF THE DISCLOSURE

This invention is directed to a parachute provided with an external radial fabric fin having a wing-like fabric stabilizer along its upper edge.

Figure 1:
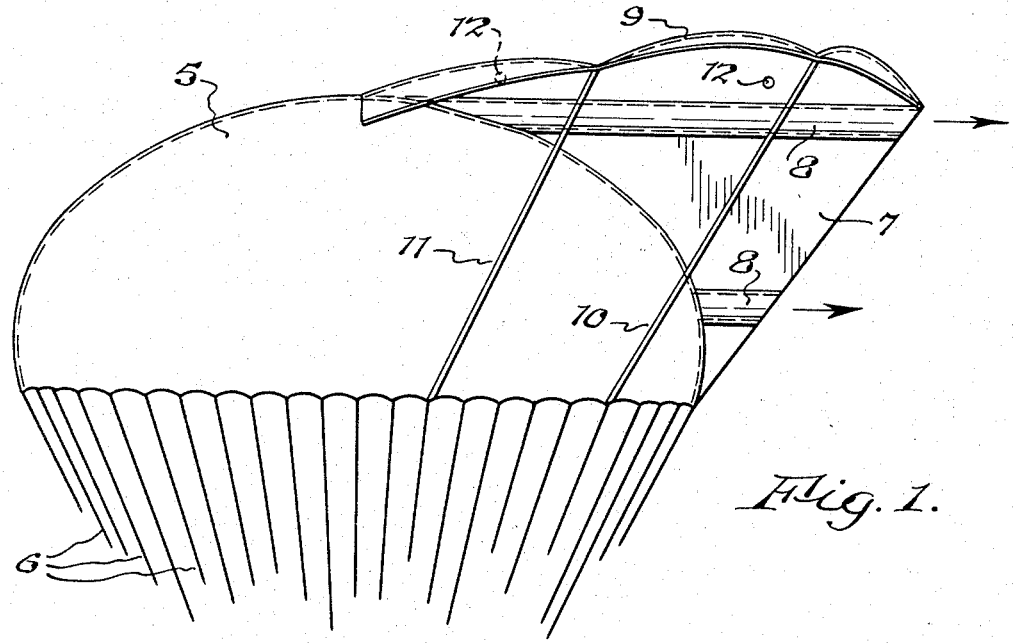

The fin is provided with a pair of spaced parallel ducts that are stiffened by the passage of air from within the canopy; and restraining tapes extend from the lateral edges of the stabilizer to the periphery of the canopy in its immediate vicinity to prevent abnormal upward deformation of the stabilizer.

---

The invention

This invention relates generally to new and useful improvements in parachutes and particularly seeks to provide a directionally stable parachute having a radial fin and a generally horizontal stabilizer, which in this instance is also a drag producing surface, forms a guide surface and flow separation edge enhancing directional and lateral stability during load-bearing flights and descents.

Heretofore, many variations in parachute constructions have been proposed to enable a human parachutist to exert directional and speed control over parachutes. Other variations have been proposed to assure quick opening of parachutes. However, most of these prior constructions require some type of manual control by the parachutist and thus are not suitable for cargo dropping where the parachute itself must be so designed and constructed as to inherently supply the necessary controls to assure a uniform flight and descent from an airplane to a predetermined landing target.

Directional and lateral stability, obviously are two of the most important requirements for parachutes used for such purposes, and parachutes constructed in accordance with this invention meet those requirements.

Therefore, an object of this invention is to provide a parachute having an external radial fabric vertical fin which projects from the center of the rear most gore and a wing-like horizontal fabric stabilizer to increase directional and lateral stability of a parachute throughout its flight and descent.

Another object of this invention is to reduce opening shock, fabric stresses, snatch force, enhance static and dynamic stability in order to achieve better controllability.

Another object of this invention is to provide a parachute of the character stated in which the vertical fin is adapted to be stiffened by at least two air ducts through which air passes from the interior of the canopy to the free atmosphere and by the upward pull (drag) exerted by the horizontal stabilizer.

Another object of this invention is to provide a parachute of the character stated in which abnormal deformation of the horizontal stabilizer is prevented by restraining tapes extending from the lateral edges thereof to the periphery of the canopy in its immediate vicinity.

Another object of this invention is to provide an auxiliary deployment vehicle by means of a horizontal stabilizer to prevent side loads on the skirt of the canopy before completion of suspension line stretch.

Another object of this invention is to enhance glide which enables the parachute to descend at a normal angle of attack with little or no thrust.

Another object of this invention is to provide a parachute of the character stated in which orifice maintainers in the form of thin plastic rings are installed at the inner end of the vertical fin stiffening ducts.

Another object of this invention is to provide adequate geometric porosity for the horizontal stabilizer in the form of equally spaced vents to prevent pressure buildups, reducing fabric stresses and function as a vertical fin position maintainer.

With these and other objects the nature of which will be apparent, the invention will be more fully understood by reference to the drawings, the accompanying detailed description and appended claims.

Figure 2:
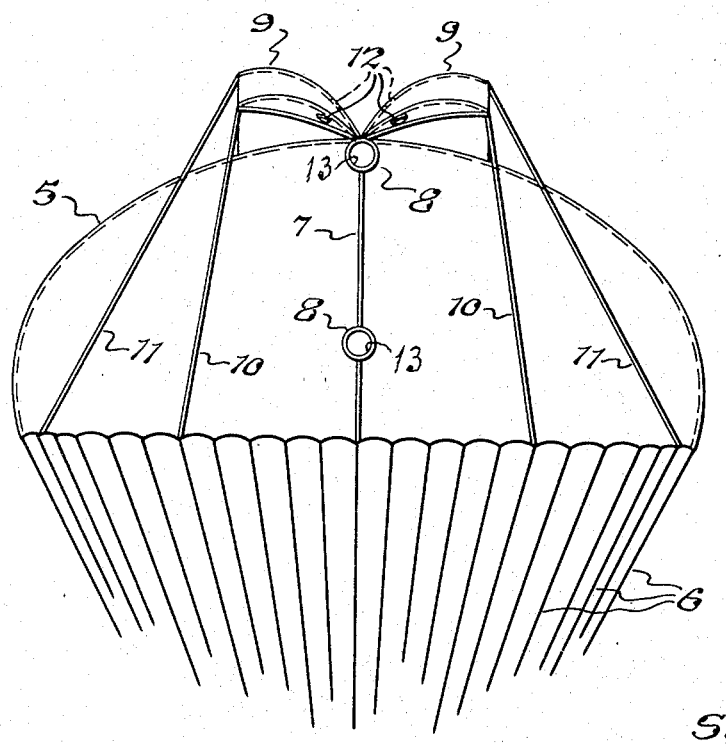

In the drawings:

FIG. 1 is a side elevation of an opened parachute canopy constructed in accordance with this invention; and FIG. 2 is a rear elevation thereof.

Referring to the drawings in detail, the invention as illustrated is embodied in a parachute having the usual generally hemi-spherical fabric canopy 5 formed from a multiplicity of gores and connected to the parachute harness (not shown) by a mutiplicity of suspension lines 6. A generally triangular directional fin 7 having its forward edge cut to fit the curve of the canopy 5 when open and a horizontal upper edge, is affixed to the rear gore of the canopy.

The fin is provided with a pair of spaced parallel fabric sleeves or ducts 8,8 which have their forward or inner ends extending into open communication with the interior of the canopy and their rear or outer ends open to the atmosphere.

The upper of the ducts 8 is positioned adjacent the upper edge of the vertical fin 7 and receives air from the crown of the canopy while the lower of the ducts 8 receives air from the lower portion or skirt of the canopy.

Grommets 13 (see FIG. 2) constructed in the shape of thin plastic rings, may be used at the inner ends of the ducts to hold them open to ensure passage of air therethrough.

A generally rectangular fabric stabilizer 9 is secured along its median line to the upper edge of the fin 7 and has its forward or inner edge affixed to the canopy 5. The lateral edges of the stabilizer 9 are restrained against abnormal upward deformation by two pairs of tapes 10,10 and 11,11 having their upper ends secured to the edges of the stabilizer and their lower ends secured to the periphery of the canopy.

Tapes, rather than cords, are preferable for this purpose because they are stronger and air will act on them during and after opening of the canopy to keep them substantially out of contact therewith.

The stabilizer 9 may be vented as at 12,12 to reduce shock loading during inflation and enable it to function more efficiently after it is fully blossomed.

In use, when the parachute canopy 5 becomes inflated to its maximum dimensions air from the interior of the canopy will pass through the ducts 8 to inflate them and thus stiffen the vertical fin 7 so that it may impart directional stability to the parachute. At the same time the stabilizer 9 is inflated to its operational position by the relative air mass flowing externally of the canopy and exerts an oscillation-damping force on the parachute through its fastenings to the vertical fin 7 and restraining tapes 10 and 11.

As the parachute continues its descent the combined action of the vertical fin 7 and the stabilizer 9 will maintain the parachute in a uniform median axial flight path of descent and obviate yawing. Thus, if lateral air currents are encountered which would tend to force the parachute to one side of its planned directional path of descent, the air action on the vertical fin would cause a slight rotation of the parachute toward the wind and automatically steer the parachute to offset the leeway effect of such lateral air currents. Also any tendency of air currents or turbulence to cause oscillation of the parachute about a horizontal axis would be promptly dampened by the lever effect of the horizontal stabilizer 9 which will exert a braking effect each time an oscillatory movement tends to displace it downwardly from its normal horizontal position.

It will be apparent from the foregoing description that parachutes constructed in accordance with this invention offer many advantages such as the ability to provide directional and lateral stability; the elimination of parachute rotation during descent; the reduction or elimination of oscillation; non-interference of the external devices with the packing and opening of the parachute; and greater drag to reduce speed of descent.

It is of course to be understood that various details of arrangements and proportions of parts may be modified within the scope of the appended claims.

I claim:

1. In a parachute wherein is provided a generally hemispherical fabric canopy and a multiplicity of suspension lines extending from the periphery thereof to a load supporting harness; the combination of a radially extending vertical direction-controlling fin affixed to the exterior of said canopy and having a generally horizontal upper edge, and a generally horizontal oscillation-dampening stabilizer affixed along its median line to the upper edge of said fin and having its inner edge affixed to said canopy.

2. The parachute of claim 1 in which said fin is fabric and means are provided for stiffening same when said canopy is opened.

3. The parachute of claim 2 in which said fin stiffening means includes at least one horizontal fabric sleeve attached thereto and having its inner end extending into open communication with the interior of said canopy whereby flow of air therefrom will inflate and stiffen said sleeve.

4. The parachute of claim 3 in which said horizontal stabilizer is fabric and means extending between lateral edge portions thereof and said canopy are provided to restrain said lateral edge portions against abnormal upward deformation.

5. The parachute of claim 4 provided with at least two of said fin stiffening sleeves arranged in spaced parallel relation, one of said sleeves being disposed adjacent the upper horizontal edge of said fin and underlying said horizontal stabilizer.

6. The parachute of claim 5 in which the inner ends of said stiffening sleeves are provided with transverse grommets to hold same open for the admission of air from within said canopy.

References Cited

UNITED STATES PATENTS 3,104,857  9/1963  Knacke et al. _____ 244—145

FOREIGN PATENTS 648,775  8/1937  Germany.
358,596  4/1938  Italy.

FERGUS S. MIDDLETON, *Primary Examiner.*

R. A. DORNON, *Assistant Examiner.*